United States Patent [19]

Hirosawa et al.

[11] Patent Number: 4,827,148

[45] Date of Patent: May 2, 1989

[54] VEHICLE REVERSE CONTROL DEVICE

[75] Inventors: Hiroaki Hirosawa; Atsuo Ohta, both of Saitama; Morio Sato, Kanagawa, all of Japan

[73] Assignee: Honda Giken Kogyo Kabushiki Kaisha, Tokyo, Japan

[21] Appl. No.: 146,061

[22] Filed: Jan. 20, 1988

[30] Foreign Application Priority Data

| | | | |
|---|---|---|---|
| Jan. 20, 1987 | [JP] | Japan | 62-9140 |
| Jan. 31, 1987 | [JP] | Japan | 62-19622 |
| Feb. 17, 1987 | [JP] | Japan | 62-32518 |
| Feb. 17, 1987 | [JP] | Japan | 62-32519 |

[51] Int. Cl.[4] .................................... H02K 7/10

[52] U.S. Cl. .................................... 290/38 R; 290/45; 290/48; 318/4

[58] Field of Search .................... 290/38 R, 49, 48; 318/4, 10

[56] References Cited

U.S. PATENT DOCUMENTS

| | | | |
|---|---|---|---|
| 2,414,602 | 1/1947 | Mott | 318/4 X |
| 3,923,115 | 12/1975 | Helling | 290/45 X |
| 4,400,997 | 8/1983 | Fiala | 290/45 X |
| 4,553,441 | 11/1985 | Hamano et al. | 290/38 R X |
| 4,559,455 | 12/1985 | Tanaka | 290/38 R |
| 4,621,197 | 11/1986 | Tanaka | 290/38 R |

*Primary Examiner*—William M. Shoop, Jr.
*Assistant Examiner*—W. E. Duncanson, Jr.
*Attorney, Agent, or Firm*—Lyon & Lyon

[57] ABSTRACT

An improved vehicle reverse control system having a power circuit for a starter motor for starting an engine. The circuit may include a control element for controlling the starter motor, in combination with separate control elements for starting the engine and for controlling reverse operation, at least one of which may be located on or near the operator's handle grip. The circuit may also include an element which detects reverse operation and an element which suppresses the starter motor whenever the vehicle is operated in reverse. The circuit may also include an element for detecting when the engine is operating and an element for disabling reverse operation of the starter motor when the engine is operating. The circuit may also include elements for suppressing engine start and for suppressing reverse operation, disposed so that the starter motor may be controlled for only one of the two operations at a time.

5 Claims, 15 Drawing Sheets

VEHICLE REVERSE CONTROL DEVICE

BACKGROUND OF THE INVENTION

1. Field of the Invention

This invention relates to the field of vehicle reverse control devices. More specifically, this invention relates to the field of vehicle reverse control devices which may reverse a vehicle such as a motorcycle by the driving force of an engine starter motor.

2. Description of Related Art

In vehicle reversing devices employing a starter motor for power, the starter motor is typically designed to be rotated in the same direction, both when starting and when operating the vehicle in reverse. Driving through the transmission, the motor generally drives through a significantly different gear ratio when operating in reverse than when starting. In such devices, the speed of the vehicle operating in reverse may exhibit substantial fluctuation, depending upon such factors as the slope of the road surface or the relatively charged or uncharged condition of the battery. Because the speed of the vehicle when operating in reverse is generally rather small, it is sufficient to supply smaller amounts of power when operating in reverse than when starting. Accordingly, it would be preferable to provide reduced power for reverse control to any start control circuit. However, if the reverse control and start control circuits are combined, the start control circuit is made more complex, is made incompatible with other start control circuits, and is thus made more difficult and more expensive to maintain and repair.

In such a vehicle reversing device, the starter motor would conventionally include a starter switch for starting the engine and a reverse switch for operating the vehicle in reverse. A number of control switches, including e.g. the starter switch (for starting the engine), the reverse switch (for operating the vehicle in reverse), as well as other controls such as a lighting switch, a dimmer switch or a blinker switch, generally must all be located near the vehicle handle grip in such an instance. This arrangement of switches can be complicated for the vehicle operator, and may require expensive design of the vehicle's operator console. Accordingly, it would be preferable to reduce the number of controls required on the handle grip of the vehicle.

In such a vehicle reversing device using a starter motor for power, a reverse power transmission system for transmitting power from a starter motor to a rear axle would typically include a clutch which is disengaged at vehicle start. The starter motor operates to transmit the driving force of the motor via a one-way clutch to a crankshaft for starting the engine. When operating in reverse, the engine is typically stopped, the power tranmission system for transmitting power from the engine to the rear axle is disengaged and the reverse power transmission system is engaged. The starter motor operates in the same direction as in starting, to transmit the driving force of the motor via the reverse power transmission system to the rear axle for rotating the rear axle in a reverse direction to operate the vehicle in reverse.

Given the foregoing system, the crankshaft is rotated by the starter motor even when operating the vehicle in reverse. This places a substantial load on the starter motor. One partial solution is to increase the rating of the starter motor and the capacity of the battery, but this may make the starter motor and battery substantially larger and more expensive than otherwise needed. Alternately, a clutch may be provided between the starter motor and the crankshaft, in addition to the clutch in the reverse power transmission system, so as to reduce the load on the starter motor. However, this can make the entire structure more complex, larger and more expensive, and more difficult to maintain and repair.

Further, in such a vehicle reversing device, the engine is started by rotating a crankshaft by the starter motor, while the vehicle is reversed by using the starter motor as a source of driving force. However, if the power for the starter motor was decreased by a secular change, both the reversing operation and the starting operation of the starter motor are both made difficult, and the vehicle is made unable to operate either forward or in reverse.

SUMMARY OF THE INVENTION

In its most general form, the present invention is an improved vehicle reverse control system which avoids the problems noted in prior designs. The invention may comprise a power circuit for a starter motor for starting an engine. Alternately, the invention may comprise a method for operating such a control system.

In a first aspect of the present invention, the circuit may include a control element for controlling the starter motor in combination with separate control elements in parallel for starting the engine and for controlling the conditions for reverse operation.

Accordingly, it is an object of the invention to provide an improved reverse control system for incorporation in a vehicle. Using the device of the present invention, even when the reverse control circuit fails to operate and the vehicle cannot be moved in reverse, the engine may still be started.

In a second aspect of the present invention, a control element for controlling the starter motor is located on or near the operator's handle grip. The circuit may include an element which detects starter operation and an element which detects reverse operation. A reverse circuit may supress the starter motor whenever the vehicle is operated in reverse.

Accordingly, it is an object of the invention to provide an improved reverse control system for incorporation in a vehicle. Using the device of the present invention, the vehicle may be operated in reverse by selecting the reverse operation and by closing a first switch, or alternatively, by closing the first switch without selecting the reverse operation. Thus, it is possible to simplify the layout of controls on the handle grip by providing only the first switch or the starter switch.

In a third aspect of the present invention, the circuit may include an element for detecting when the engine is operating and an element for disabling reverse operation of the starter motor when the engine is not operating.

Accordingly, it is an object of the invention to provide an improved reverse control system for incorporation in a vehicle. Using the device of the present invention, when operating in reverse, the engine remains operational, and the starter motor is loaded only by the amount required for operating in reverse.

In a fourth aspect of the present invention, the circuit may include elements for suppressing starter motor operation unless starter mode or reverse mode has been selected and for suppressing starter operation only when reverse mode has been selected.

Accordingly, it is an object of the invention to provide an improved reverse control system for incorporation in a vehicle. The arrangement of control elements allows enablement of the start mode even with the reverse circuit inoperative.

The foregoing and other objects of the invention will become apparent after perusal of the specification, drawings and claims herein.

BRIEF DESCRIPTIOH OF THE DRAWIHGS

In the drawings, similar reference characters denote similar elements throughout the several views.

DESCRIPTION OF THE PREFERRED EMBODIMENT

Figure 1:
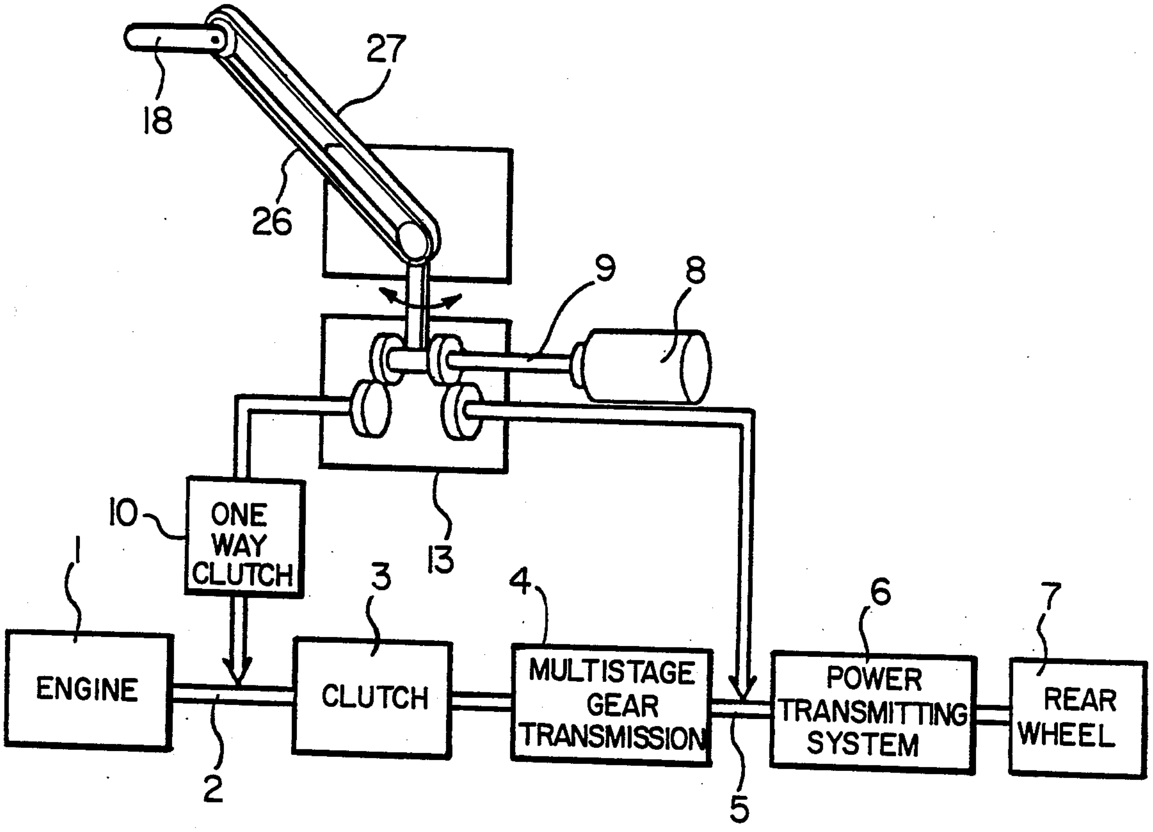
FIG. 1 is a block diagram of a system embodying the present invention.
Figure 2:
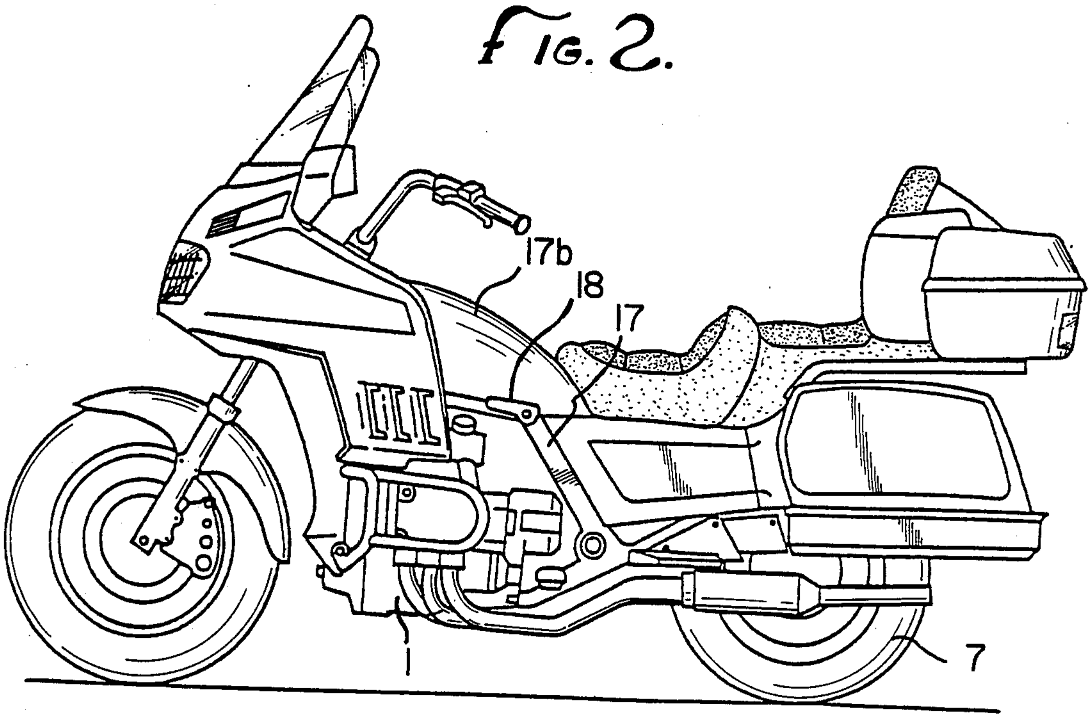
FIG. 2 is a side view of a motorcycle having a control lever mechanism for reverse.

FIG. 1 is a block diagram of a system embodying the present invention. A multiple cylinder engine 1, such as would be mounted on a large motorcycle or similar vehicle (such as illustrated in FIG. 2) is operatively connected via a crankshaft 2 and a clutch 3 to a multi-stage gear transmission 4, as is well known in the art. An output shaft 5 of the transmission 4 is operatively connected via a power transmitting system 6 to a rear wheel 7, as is well known in the art. The power transmitting system 6 may comprise sprockets, chains, gears and shafts, as well as other elements common to motorcycle power transmitting systems. It will be clear to one skilled in the art that when the engine 1 is operating, the clutch 3 is engaged, and the transmission 4 is not set to a "neutral" position, power from the engine 1 is transmitted to the rear wheel 7, thus propelling the vehicle forward.

Figure 10:
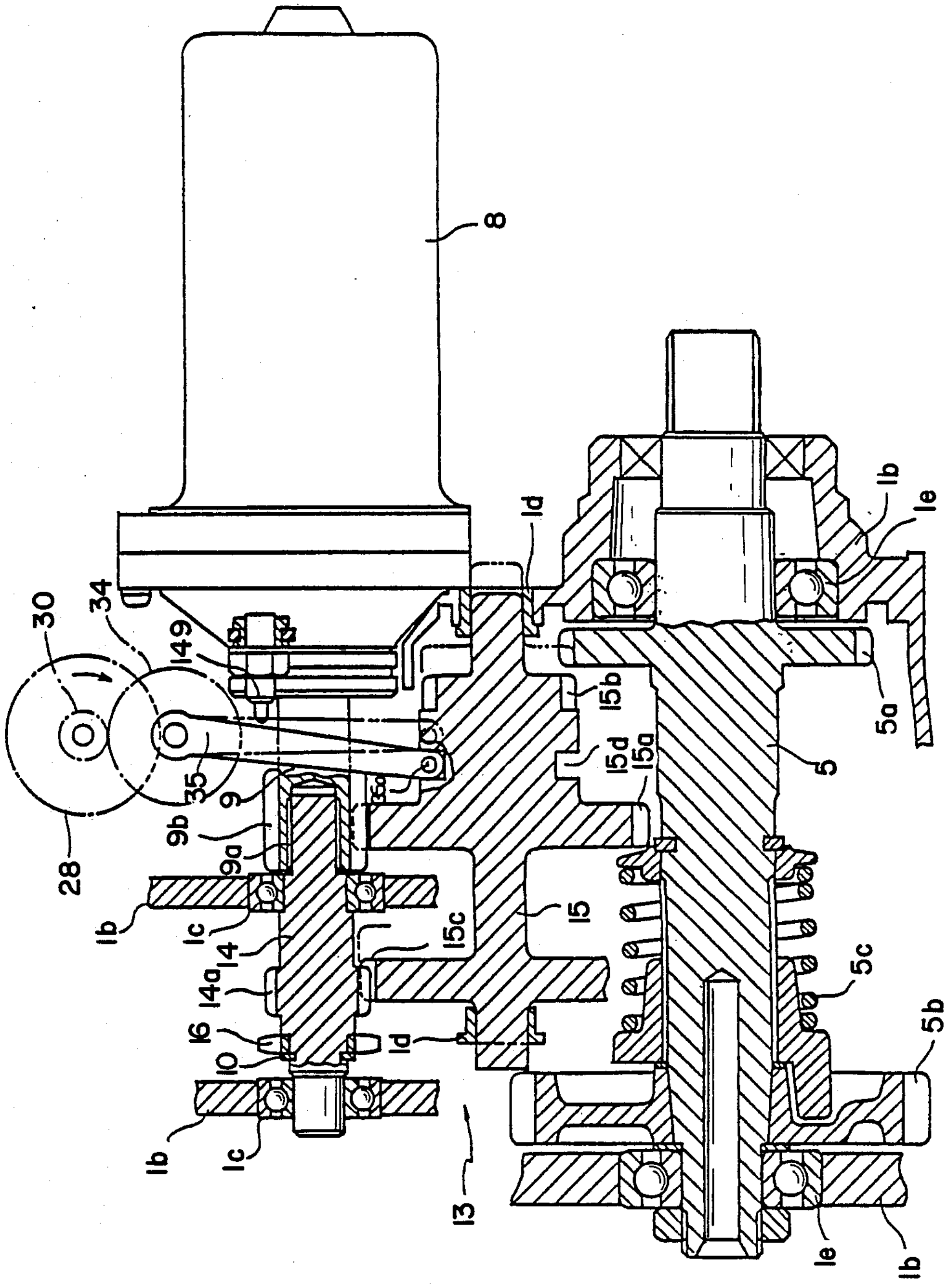
FIG. 10 illustrates the selector switch shown in cross-section with associated gearing.
Figure 11:
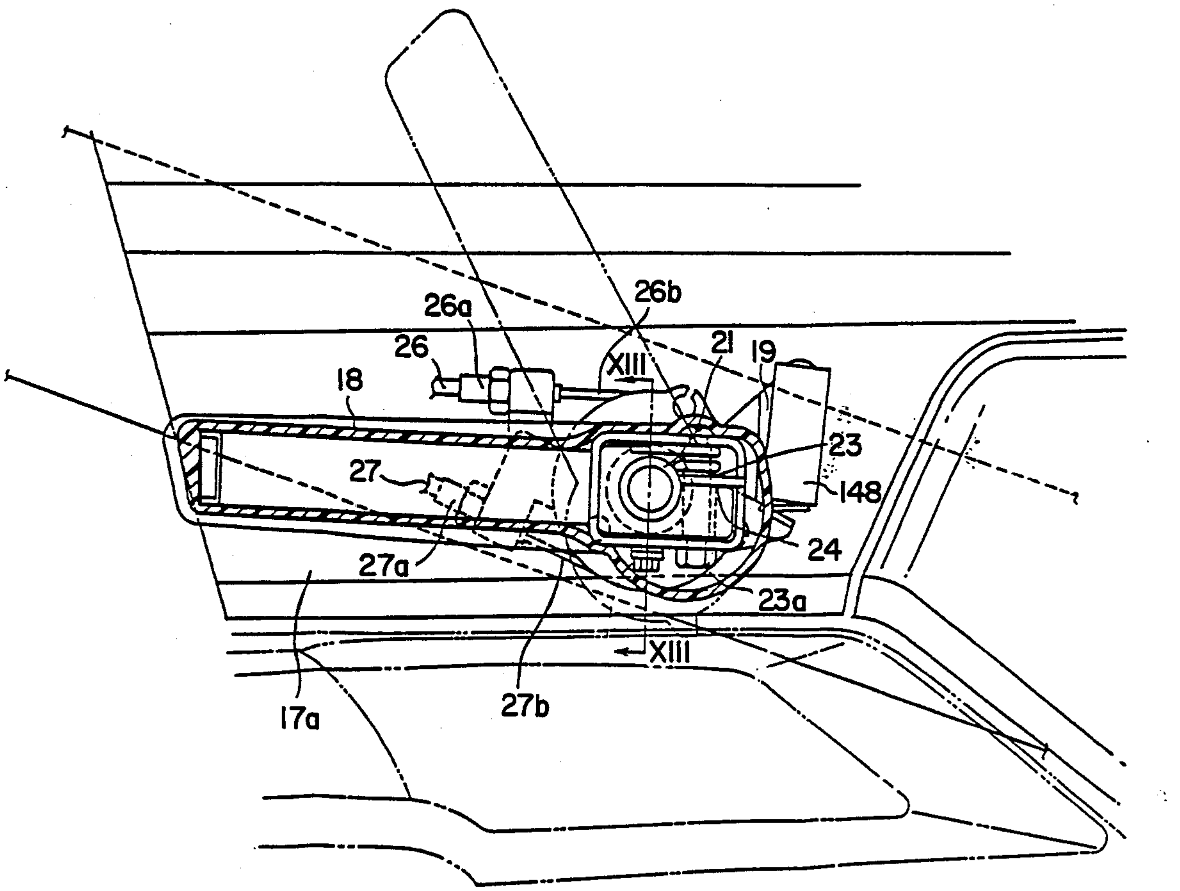
FIG. 11 illustrates the reverse level mechanism associated with the selector switch in cross-sectional side view.

An output shaft 9 of a starter motor 8 is operatively connected via a one-way clutch 10 to the crankshaft 2, as is well known in the art. The output shaft 9 is also operatively and selectively connected via gear reduction to the output shaft 5 of the transmission 4. The coupling of the starter motor output shaft 9 to the output shaft 5 of the transmission 4 may be accomplished by a gear reduction and a clutch interposed therebetween. Alternatively, a selector switch may be employed. A selector switch 13 is illustrated in FIG. 10. It will be clear to one skilled in the art that when either the clutch 3 is disengaged or when the transmission 4 is set to "neutral", and the starter motor 8 is not coupled with the output shaft 5, the engine 1 can be cranked to be started by forward rotation of the starter motor 8. Alternately, when the clutch 3 is disengaged or when the transmission 4 is set to "neutral", and the starter motor output shaft 9 and the transmission output shaft 5 are engaged, the rear wheel 7 will be reversed at a relatively low speed by forward rotation of the starter motor 8. The selector switch 13 will be shown to control selection of the start and reverse modes. Starting and stopping the starter motor 8, as well as the actual rotational speed of the starter motor 8, is controlled by an electrical control device schematically illustrated in FIG. 3.

FIGS. 10 through 15 illustrate the construction of the selector switch 13 and controls incorporated into the drive system and vehicle as seen in FIGS. 1 and 2. The output shaft 9 of the starter motor 8 is configured at the distal end with a hole *9a* coaxial therein. A starting shaft 14 is disposed with one end in the hole *9a* and coaxially aligned with output shaft 9 so as to be rotatable relative to output shaft 9 and rotatably supported through bearings *1c* to a crankcase 16 of the engine 1.

A selector gear shaft 15 is disposed parallel to the output shaft 9 and the starting shaft 14, and is axially slidably and rotatably supported through bearings *1d* to crankcase *1b*. The selector gear shaft 15 is integrally formed with a gear *15a* normally meshing with a gear *9b* of the output shaft 9. The selector gear shaft 15 is also integrally formed with gears *15b* and *15c* selectively engageable engaging with a gear *5a* integral with the output shaft 5 of the transmission 4 and a gear 14 integral with the starting shaft 14, respectively.

The output shaft 5 of the transmission 4 is disposed parallel to the output shaft 9 of the starter motor 8, the starting shaft 14, and the selector gear shaft 15, and is rotatably supported through the bearings *1e* to the crankcase *1b*. An output gear *6b* is engaged with the output shaft 5 with a damper *5c* interposed between the output shaft 5 and the output gear *5b*. The output shaft 5 is operatively connected through the outpute gear *5b* to the power transmitting system 6 and in turn to rear wheel 7.

A sprocket 16 is engaged via a one-way clutch 10 onto the starting shaft 14, and is operatively connected via a chain (not shown) to the crankshaft 2 of the engine 1.

Figure 12:
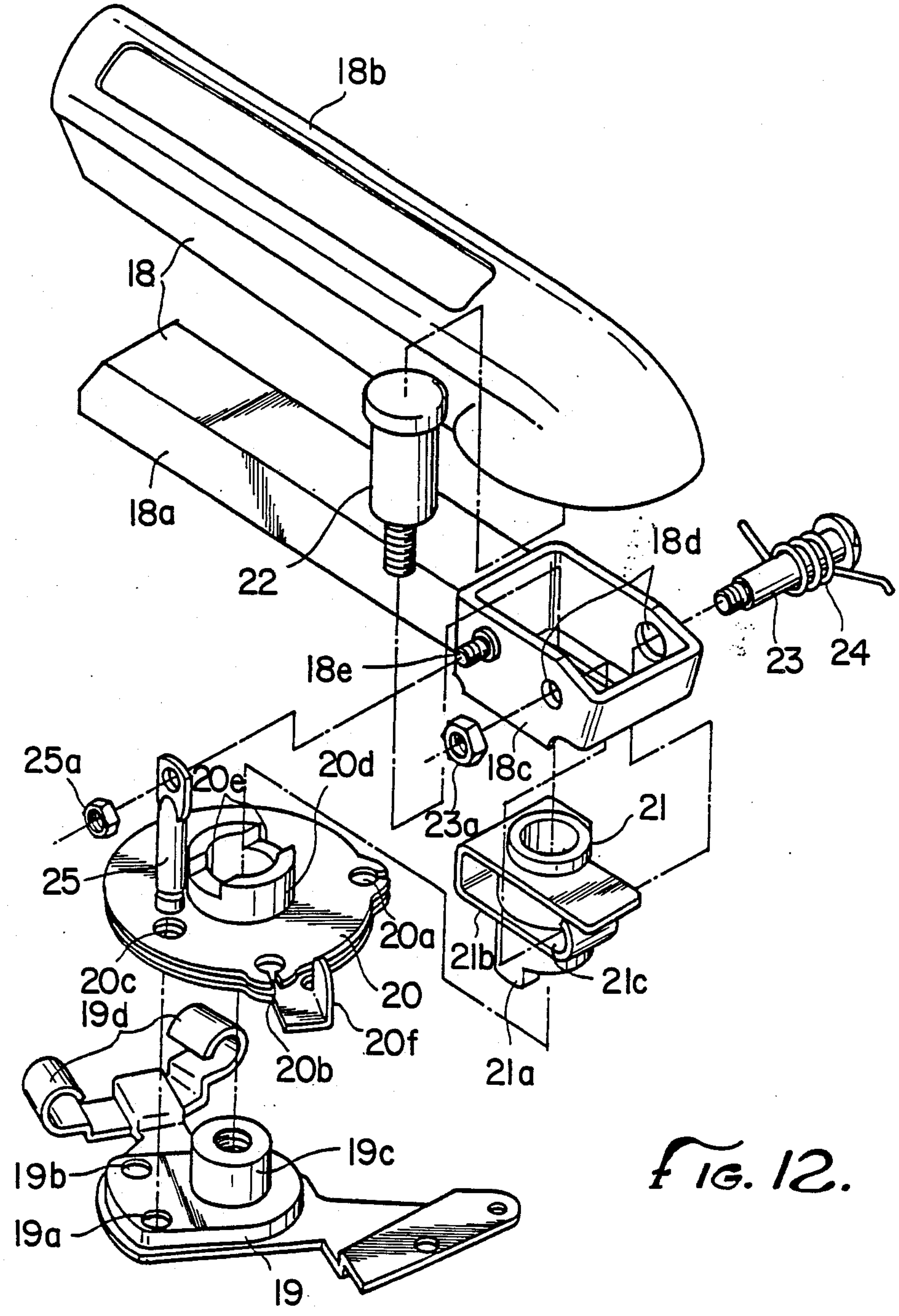
FIG. 12 is an exploded perspective view of the lever-mechanism of FIG. 11.
Figure 13:
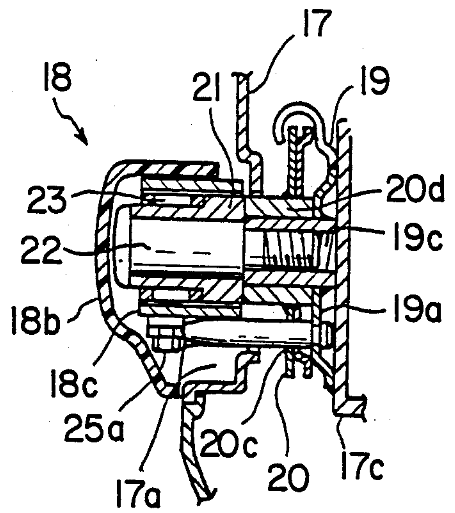
FIG. 13 is a cross-sectional view taken along line XIII—XIII of FIG. 11.
Figure 14:
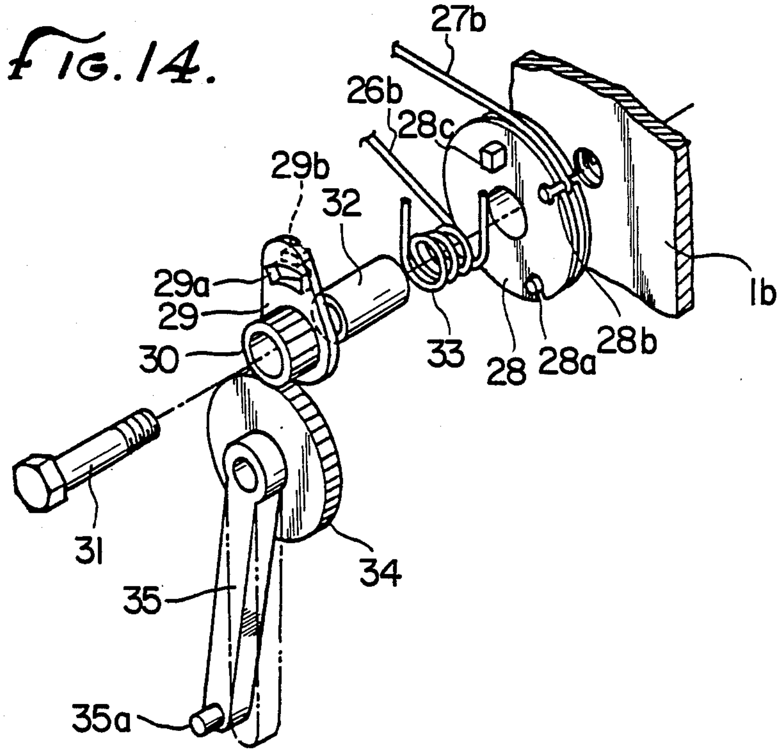
FIG. 14 is an exploded perspective view of the selector control linkage assembly.

A vehicle body cover 17 is formed with a recess *17a* for receiving a reverse lever 18 at a left lower position of a tank *17b*. A stay 19 is fixed to the vehicle body frame 17*c* inwardly of the recess 17*a* as best seen in FIG. 13. The stay 19 is formed with a pair of holes 19*a* and 19*b*, and is integrally formed with a cylindrical portion 19*c*, as best seen in FIG. 12. A pulley 20 is formed with cable connecting portions 20*a* and 20*b* for connecting ends of the inners 26*b* and 27*b* of cables 26 and 27 respectively (described hereinafter). The pulley 20 is integrally formed with a sleeve 20*d* having a pair of recesses 20*e* at the upper end thereof. A boss 21 is formed with a pair of projections 21*a* engageable with the recesses 20*e* of the sleeve 20*d*. A base 21*b*, formed with a shaft supporting portion 21*c*, is integrally fixed to the boss 21.

In a preferred embodiment, the reverse lever 18 may comprise a steel lever body 18*a* and a plastic lever cover 18*b*. A base portion 18*c* of the lever body 18*a* is formed with holes 18*d* aligned with the shaft supporting portion 21*c* of the base the 21*b*, and is further formed at its left side with a pin supporting shaft 18*e* integrally projecting therefrom.

A reverse operation mechanism is assembled from the reverse lever 18, the stay 19, the pulley 20, and the boss 21, as follows. The sleeve 20*d* of the pulley 20 is engaged with the cylindrical portion 19*c* of the stay 19. A stop screw 22 is inserted into the boss 21, and is threaded so as to be firmly engaged at its lower end with the cylindrical portion 19*c* of the stay 19. A pivot shaft 23 is inserted through the holes 18*d* of the base portion 18*c* and the shaft supporting portion 21*c* of the 21*b*. A coil spring 24 is mounted on the pivot shaft 23, and a nut 23*a* is threaded so as to be engaged with the threaded end of the pivot shaft 23. A pin 25 is inserted through the hole 20*c* of the pulley 20, and is engaged with either of the holes 19*a* or 19*b*. The pin 25 is fixed at its top portion to the pin supporting shaft 18*e* by a nut 25*a*.

The stay 19 is formed with a cable holder 19*d* for holding respective ends of the outers 26*a* and 27*a* of two cables 26 and 27. A pulley 28 is formed with cable connecting portions 28*a* and 28*b* for connecting the other ends of the inners 26*b* and 27*b* of the cables 26 and 27. The pulley 28 is formed at its side surface with a projection 28*c*.

A rotating arm 29 is formed with a channel 29*a* loosely engageable with the projection 28*c*, and is further formed with a projection 29*b* an in opposed relationship to the projection 28*c*. The rotating arm 29 is integrally formed with a gear 30. A bolt 31 is inserted through the gear 30 and the rotating arm 29, and is further inserted through a collar 32. A coil spring 33 is mounted on the collar 32. The front threaded end of the bolt 31 is inserted through the pulley 28, and is threaded so as to be engaged with the crankcase 1*b*. The projections 28*c* and 29*b* are biased by both ends of the coil spring 33; thus the pulley 28 and the rotating arm 29 may be relatively rotatable by elastic deformation of the coil spring 33. Further, the rotating arm 29 is disposed so that it follows the rotation of the pulley 28.

A gear 34, meshing with the gear 30, is rotatably supported by the crankcase 1*b*, and a reverse arm 35 is fixed to the gear 34. The reverse arm 35 is formed at its free end with an engagement pin 35*a*, so as to be engaged with a groove 15*d* formed on the selector shaft 15, as seen in FIG. 10.

A reverse switch 149 is provided on the starter motor 8 side of the reverse arm 35. The pulley 20 is formed with a projection 20*f*. A reverse lever switch 148 having a contact is provided such that when the reverse lever 18 is moved to its lower limit position (i.e. pushed down), the contact is opened, while when the reverse lever 18 is pulled away from such lower limit position (i.e. pulled up), the contact is closed.

Figure 16:
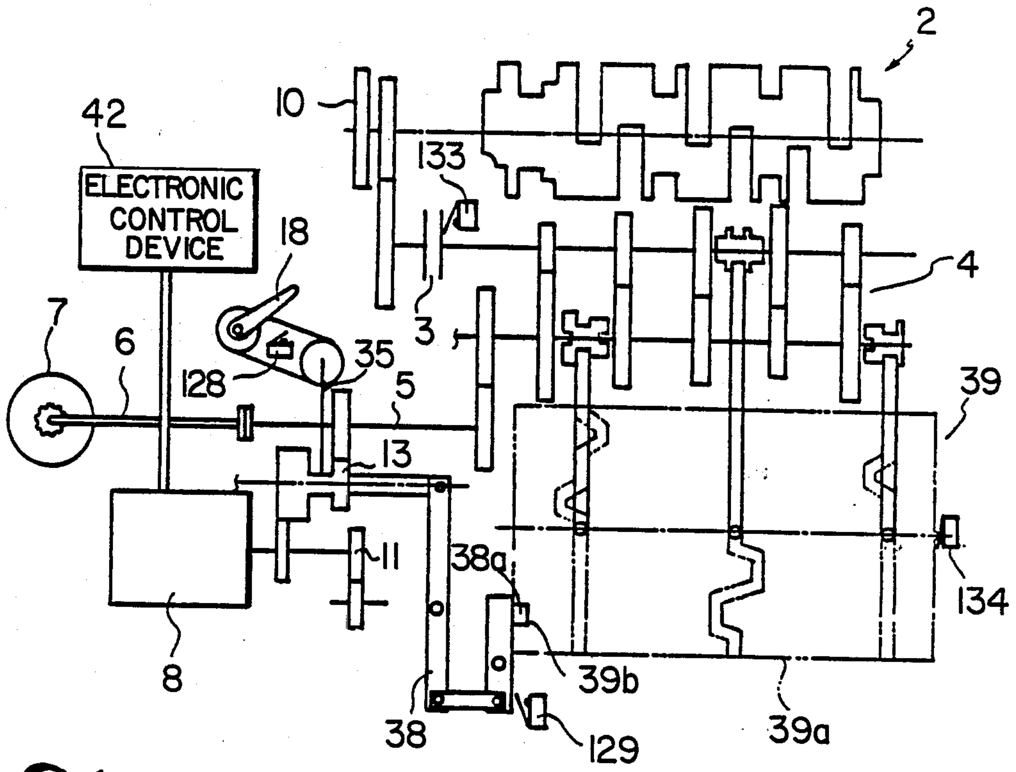
FIGS. 16 and 17 are diagrammatic illustrations of a vehicle reverse control device operating in reverse and at engine start, respectively wherein the selector switch does not disengage the starter motor from the crank shaft.
Figure 17:
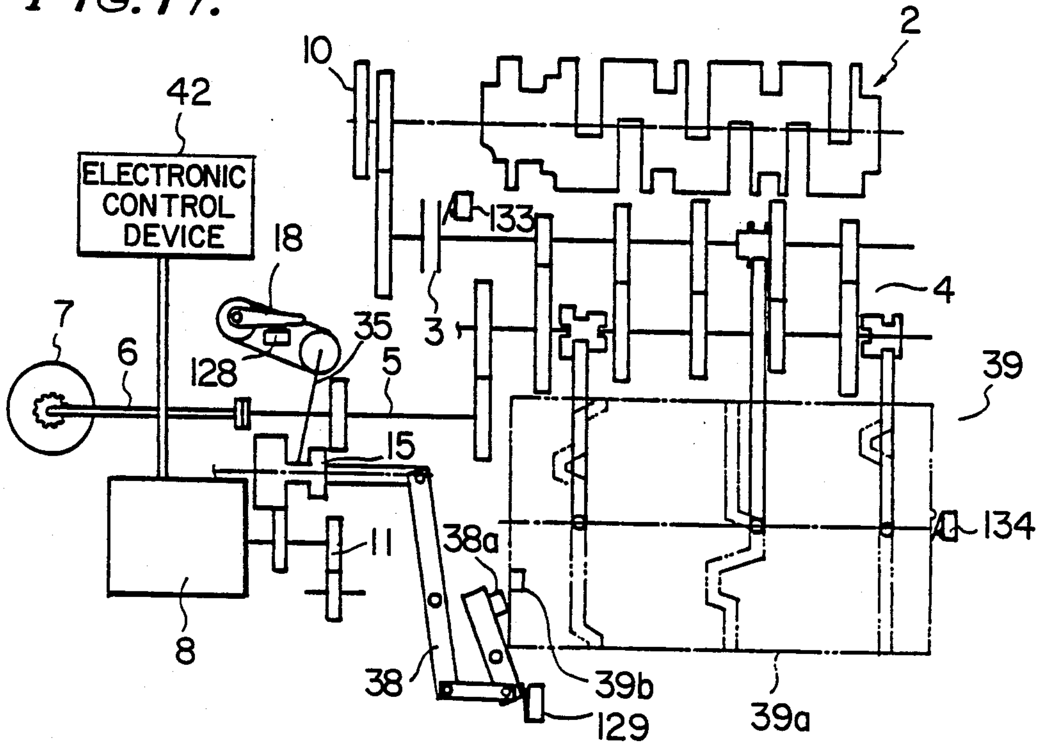
Figure 18:
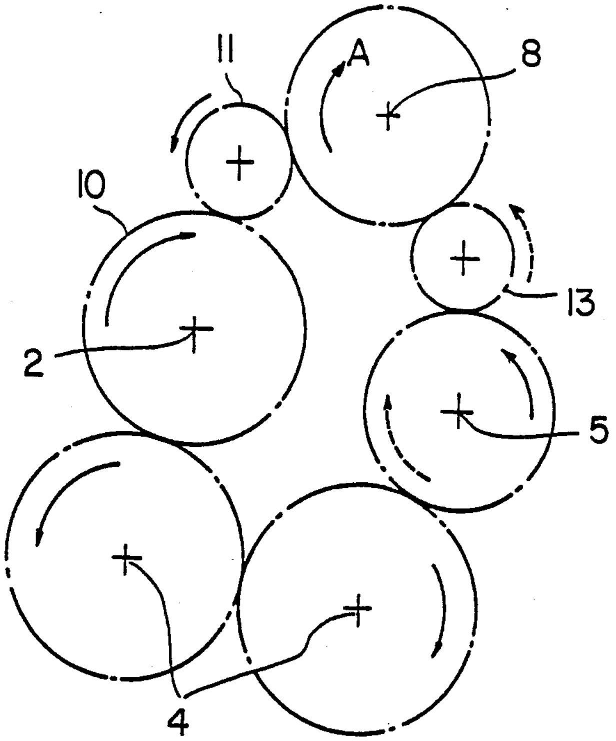
FIG. 18 is a schematic of the gear train of FIG. 16 and 17.

In an alternate embodiment illustrated in FIGS. 16 and 17, the selector switch 13 does not operate to engage and disengage the gearing between the starter motor 8 and the crankshaft 2. Instead, the engine 1 is intended to be running when reverse is employed such that the one way clutch 10 allows the engine 1 to overrun the starter motor 8. This removes the need for disengaging the crankshaft 2 from the starter motor 8. If the engine 1 were not overrunning the starter motor or, if stopped, not disengaged therefrom, the starter would be required to drive both the vehicle in reverse and crank over the engine. In the selector switch of FIG. 10, the engine may be off as it is disengaged when reverse is selected. In the system of FIGS. 16 and 17, the engine may be running to remove the engine load from the starter motor 8 when in the reverse mode.

The starter motor 8 is operatively connected via a reduction gearing 11 and a one-way clutch 10 to the crankshaft 2. When the starter motor 8 is rotated, the crankshaft 2 is rotated thereby unless it is overrunning the one-way clutch 10.

In FIGS. 16 and 17, the starter motor 8 is releaseably connected via a reduction gearing and reverse clutch assembly 13 to the output shaft 5. A selector mechanism 35 for the assembly 13 includes a "lost motion" mechanism. Selector 35 is operatively connected via a reverse operation transmission system including a linkage mechanism, as previously described, operated by a reverse lever 18. In this embodiment, the selector 35 is also operatively connected via a linkage mechanism 38 to a neutral detecting member 38*a*.

When the reverse lever 18 is lifted, so as to reverse the vehicle when the transmission 4 is set to "neutral", the selector 35 will select its "reverse" position. This motion is transmitted via the link mechanism 38 to the neutral detecting member 38*a*, which is engaged with a recess 39*b* of a shift drum 39*a* of the shift mechanism 39. Accordingly, the selector 35 will select its reverse positions and engage the output shaft 5. This will cause the output shaft 5 to rotate in a reverse direction (i.e. reverse from the forward direction used when the vehicle is driven by the engine 1 in the foreward direction).

When the transmission 4 is not set to "neutral", the neutral detecting member 38*a* of the link mechanism 38 cannot be engaged with the recess 39*b* of the shift drum 39*a* of the shift mechanism 39 when the reverse lever 18 is set to "reverse". Accordingly, unless the transmission 4 is set to "neutral", the selector 35 cannot be used to select "reverse" and cause engagement with the output shaft 5. Thus, torque from the starter motor 8 will not be transmitted via the output shaft 5 back to the crankshaft 2.

Figure 3:
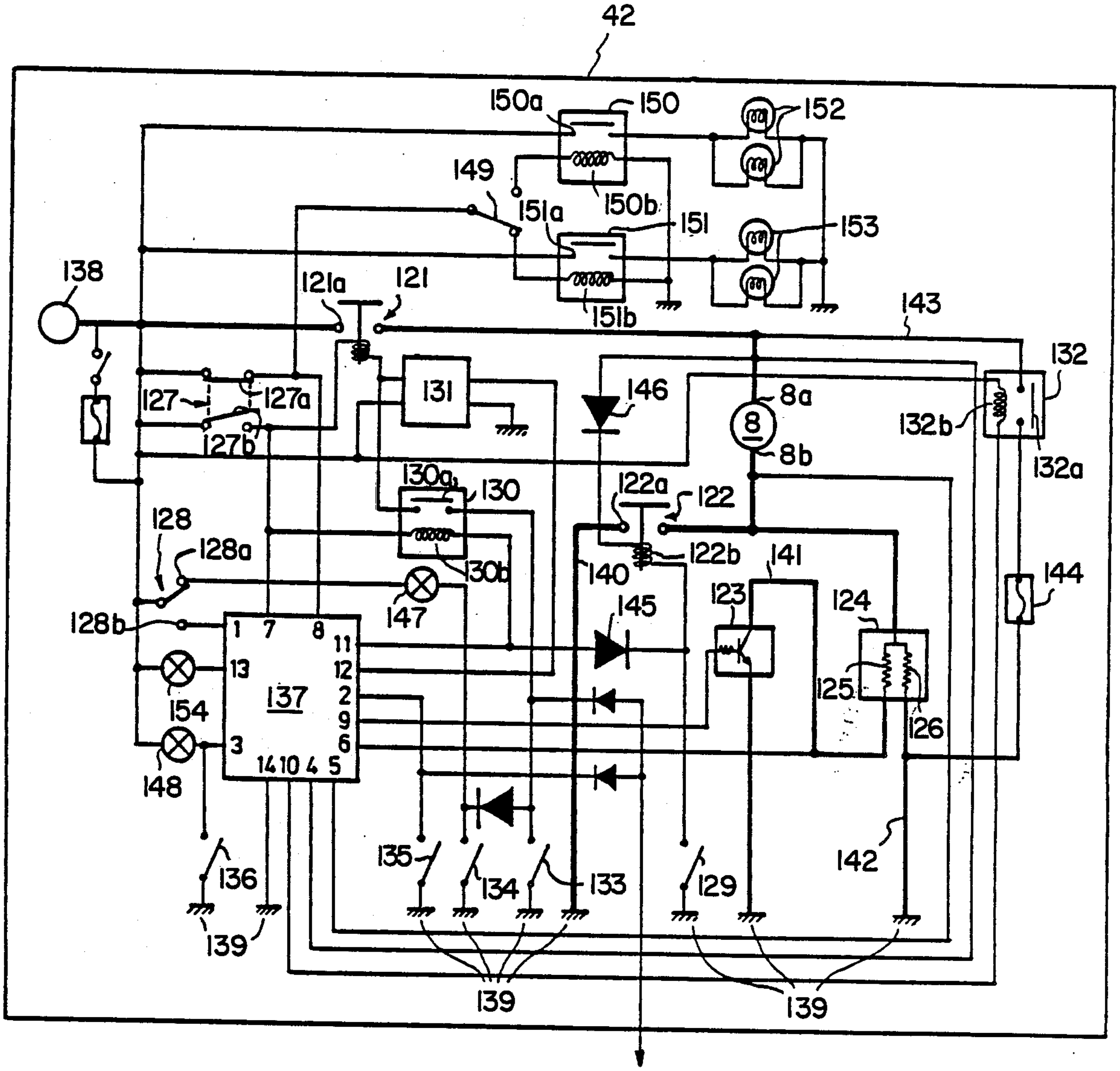
FIG. 3 is a circuit diagram of an electric control device for use with the present invention.
Figure 15:
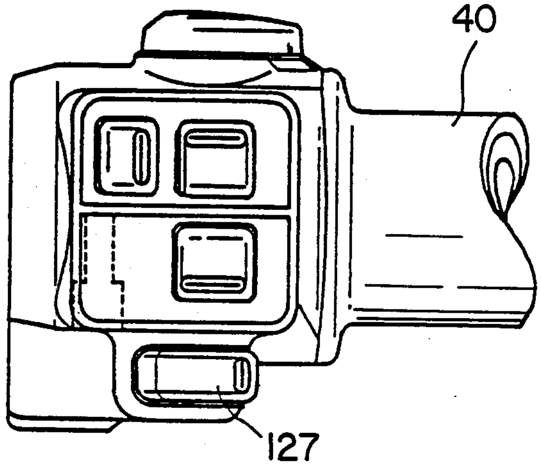
FIG. 15 is a plan view of the starter switch shown mounted to the handle bar.

A starter switch 127, disclosed hereinafter with respect to FIG. 3, is located at an inside position of the right handle grip 40 illustrated in FIG. 15.

FIG. 3 is a circuit diagram of an electric control device ("ECD") 42 for use with the present invention. In a preferred embodiment, the ECD 42 may comprise a first starter magnetic relay 121 for use as a first switch for controlling the operation of starter motor 8, a second starter magnetic relay 122 for use as a second switch for controlling the operation of starter motor 8, a power transistor 123 for use as a reverse control circuit for controlling feed current to the starter motor 8 when reversing, and a feed current suppressor circuit 124 (itself comprising resistors 125 and 126) for suppressing the feed current to starter motor 8 when reversing, a reverse relay 130 for switching on the first starter magnetic relay 121, a starter magnetic controller 131 for supplying a self-holding current to a coil 121*b* of the relay 121 after the relay 121 is switched on, a speed limiter relay 132 for short-circuiting the positive electrode 8*a* and the negative electrode 8*b* of the starter motor 8 when the rotating speed of the starter motor 8 exceeds a predetermined speed when reversing.

The ECD 42 may also comprise several switches for indicating operating conditions, including a starter switch 127 set on when starting, a reverse switch 128 set on when the reverse lever 18 on the vehicle is set to a "reverse" position, a reverse switch 129 set off when the transmission 4 is set to "neutral" and the reverse lever is set to "reverse", a clutch switch 133 set on when clutch 3 is disengaged, a neutral switch 134 set on when transmission 4 is set to "neutral", a side stand switch 135 set on when a side stand (not shown) on the vehicle is lifted, and an oil pressure switch 136 set off when engine 1 is operating. The ECD 42 may also comprise an electronic control unit ("ECU") 137 for controlling these elements.

An engine starting wiring conductor 140 connects a positive voltage terminal 138 in series with a contact 121*a* of the relay 121, the starter motor 8, a contact 122*a* of the relay 122, and ground 139. A reverse wiring conductor 141 connects the contact 122*a* of the relay 122 in series with the resistor 125 of the suppressor circuit 124, the power transistor 123 and ground 139, and in parallel with the circuit formed by the conductor 140 between the contact 122*a* and ground 139. A leak wiring conductor 142 connects the contact 122*a* of the relay 122 in series with the resistor 126 of the suppressor circuit 124 and ground 139, and in parallel with the circuit formed by the conductor 141. A brake wiring conductor 143 connects the positive terminal 8*a* of the starter motor 8 in series with a contact 132*a* of the relay 132, a fuse 144 and ground 139.

A conductor connects a contact 127*b* of the starter switch 127 in series with a coil 130*b* of the relay 130, a diode 145, the reverse switch 129 and ground 139. A conductor connects the contact 127*b* in series with a coil 121*b* of the relay 121, a contact 130*a* of the relay 130, the clutch switch 133 and ground 139. A conductor connects the positive terminal 8*a* of starter motor 8 in series with a diode 146, a coil 122*b* of the relay 122 and the reverse switch 129. A conductor connects a contact 128*a* of the reverse lever switch 128 in series with a neutral indicator lamp 147, the neutral switch 134 and ground 139. The positive voltage terminal 138 is connected to the contact 128*b* when the reverse lever is set to "reverse" and otherwise to contact 128*a*.

In a preferred embodiment, the ECU 137 may comprise a set of terminals 137-1 to 137-11, each connected to elements of the ECD 42, for detecting the state of the ECD 42 and for controlling the ECD 42 by electronic signals. The terminal 137-1 is connected to the contact 128*b*, which as noted herein is lever is set to "reverse". The terminal 137-2 is connected via the side stand switch 135 to ground 139. The terminal 137-3 is connected via an oil pressure indicator lamp 148 to the positive voltage terminal 138 and via the oil pressure switch 136 to ground 139. The terminals 137-4 and 137-5 are connected to the positive and negative terminals 8*a* and 8*b* of the starter motor 8, so as to detect voltage across the starter motor 8. The terminal 137-6 is connected to a conductor 141 to detect voltage across the power transistor 123. The terminal 137-7 is connected to the contact 127*b* so as to detect operation of the starter switch 127.

The terminal 137-8 supplies current via a dimmer switch 149 to either a coil 150*b* of a high-beam relay 150 or a coil 151*b* of a low-beam relay 151, depending upon the setting of the switch 149, even when reversing the vehicle. When the coil 150*b* of relay 150 is triggered, a contact 150*a* of relay 150 is closed, thus energizing a high-beam lamp 152. Similarly, when the coil 151*b* of the relay 151 is triggered, a contact 151*a* of the relay 151 is closed, thus energizing a low-beam lamp 153.

The terminal 137-9 supplies a signal for controlling the output of the power transistor 123. The terminal 137-10 is connected to the contact 132*b* of the relay 132, for turning the speed limiter the relay 132 on and off. When the coil 132*b* of the relay 132 is triggered, a contact 132*a* of the relay 132 is closed. The terminal 137-11 is connected to the contact 130*b* of the relay 130, for switching on the relay 130 even when the reverse switch 129 is off; when the relay 130 is switched on, the contact 121*b* of the relay 121 may be triggered and the relay 121 may thus be switched on. The terminal 137-12 supplies current for operating the starter magnetic controller 131. As shown herein, the ECU 137 supplies current at this terminal a predetermined period of time after the first starter magnetic relay 121 is triggered; this current is then sufficient for self-holding the relay 121. The terminal 137-13 supplies a signal for turning on a reverse indicator lamp 154 when reversing.

Figure 4:
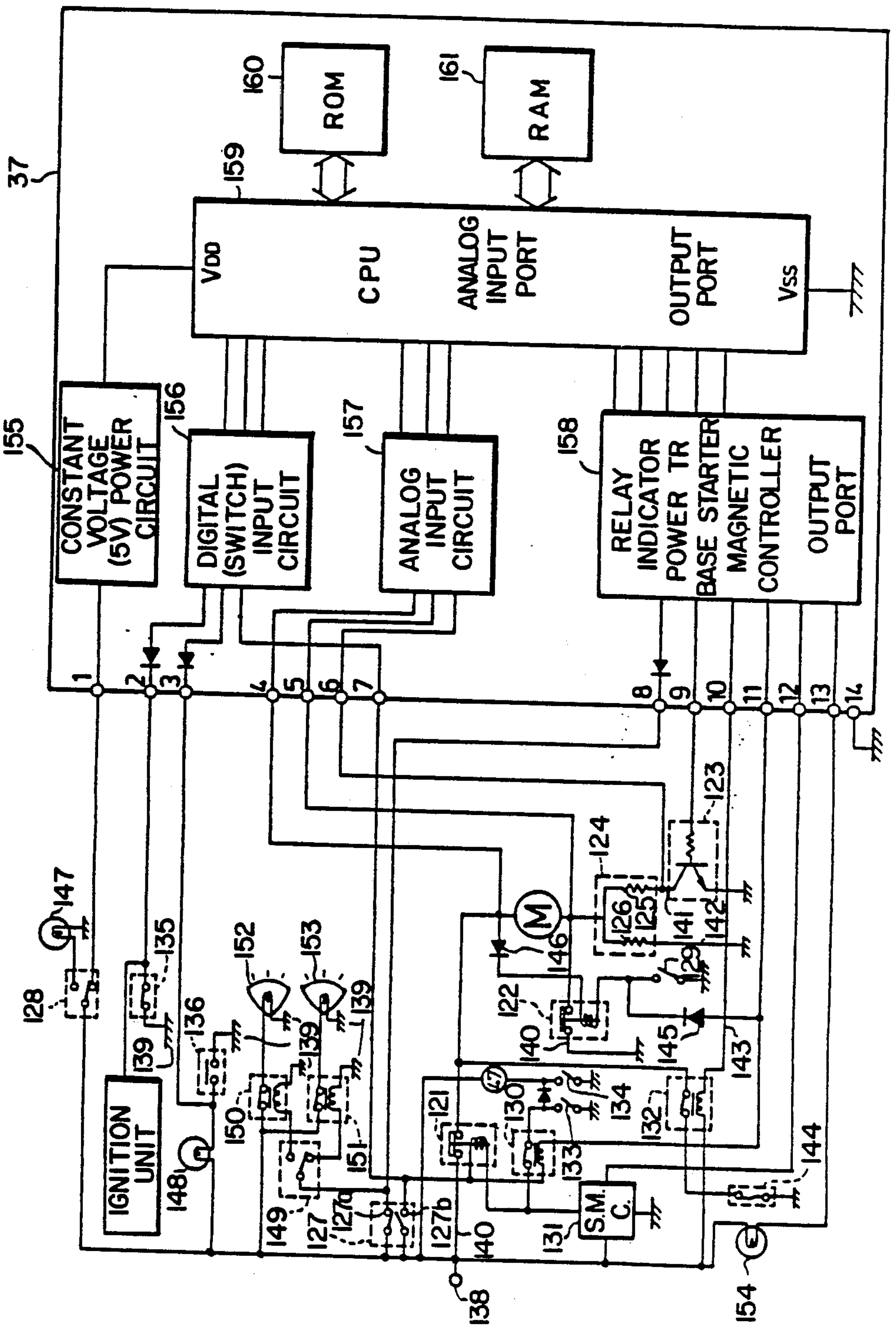
FIG. 4 is a circuit diagram of an electronic control unit for use with the present invention.

FIG. 4 is a circuit diagram of an electronic control unit for use with the present invention. In a preferred embodiment, the ECU 137 may comprise a power supply circuit 155, a digital input circuit 156, an analog input circuit 157, an output circuit 158, a CPU 159, a ROM 160, and a RAM 161. The power supply circuit 155 supplies a constant voltage of about +5.0 volts via the terminal 137-1 of the ECU 137. The digital input circuit 156 is connected to the terminals 137-2 and 137-3 for receiving digital inputs and supplying those inputs to the CPU 159. The analog input circuit 157 is connected to the terminals 137-4 through 137-7 for receiving analog inputs and supplying those inputs to the CPU 159. The output circuit 158 is connected to the terminals 137-8 through 137-13 for receiving outputs from the CPU 159 and transmitting those outputs to the ECD 42. The CPU 159, operating under control of computer programs stored in the ROM 160 and operating in conjunction with memory storage of the RAM 161 receives inputs and generates outputs by performing steps disclosed herein with respect to FIGS. 5 and 6. The RAM 161 may be used for storing digital and analog input data, output data, and intermediate calculation results.

Figure 6:
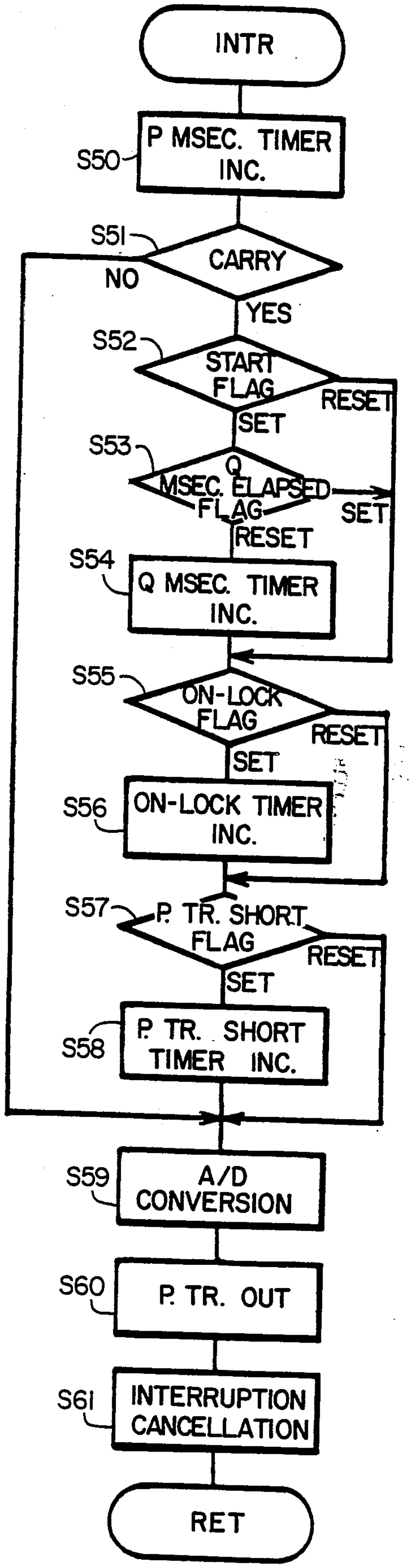
FIG. 6 is a flow chart of a program interrupt routine for use with the present invention.

FIG. 6 is a flow chart of a program interrupt routine for use with the present invention. The program interrupt routine is executed once each millisecond (msec).

At step 50, an interrupt count value is incremented; the count value is incremented until a value of p is reached, whereupon a carry is generated and the count value is reset; thus a carry is generated every p msec. At step 51, the routine checks for the presence of a carry. If the carry is present, control continues with step 52; otherwise control continues with step 59. Accordingly, steps 52–58 are executed once each p msec.

At step 52, the routine checks the start flag. If the start flag is set, control continues with step 53; otherwise control continues with step 55. At step 53, the routine checks the q-msec-elapsed flag. If the q-msec-elapsed flag is not set, control continues with step 54; otherwise control continues with step 55. At step 54, a q-msec counter is incremented. Steps 52–54 allow the routine to check if a time period of q msec ($q>p$) has elapsed since the close of the start switch 27.

At step 55, the routine checks the on-lock flag. The on-lock flag is set when an overload is applied to the starter motor 8, e.g. if reverse movement of the vehicle is hindered by an obstacle behind the vehicle. In a preferred embodiment, the on-lock flag is set whenever the voltage across the starter motor 8 is +3.0 volts or less continuously for between about 3 and about 5 seconds. If the on-lock flag is set, control continues with step 56; otherwise control continues with step 57. At step 56, an on-lock counter is incremented. Steps 55–56 allow the routine to check if such an overload has occurred.

At step 57, the routine checks the power-transistor-short ("PTR-short") flag. The PTR-short flag is set when the power transistor 23 is operating improperly. In a preferred embodiment, the PTR-short flag is set whenever the power transistor 23 is turned on for a time period of r msec ($r>q$). If the PTR-short flag is set, control continues with step 58; otherwise control continues with step 59. At step 58, a PTR-short counter is incremented. Steps 57–58 allow the routine to check if such a power transistor short has occurred.

At step 59, each of the terminal voltages of the starter motor 8 is converted to a digital value. These digital values are used in another routine to calculate an average of the terminal voltages. At the completion of step 59, an average flag is set. At step 60, the power transistor is turned on or off, as appropriate. At step 61, the interrupt is cancelled, as is well known in the art, and CPU 59 returns to normal program operation.

Figure 5:
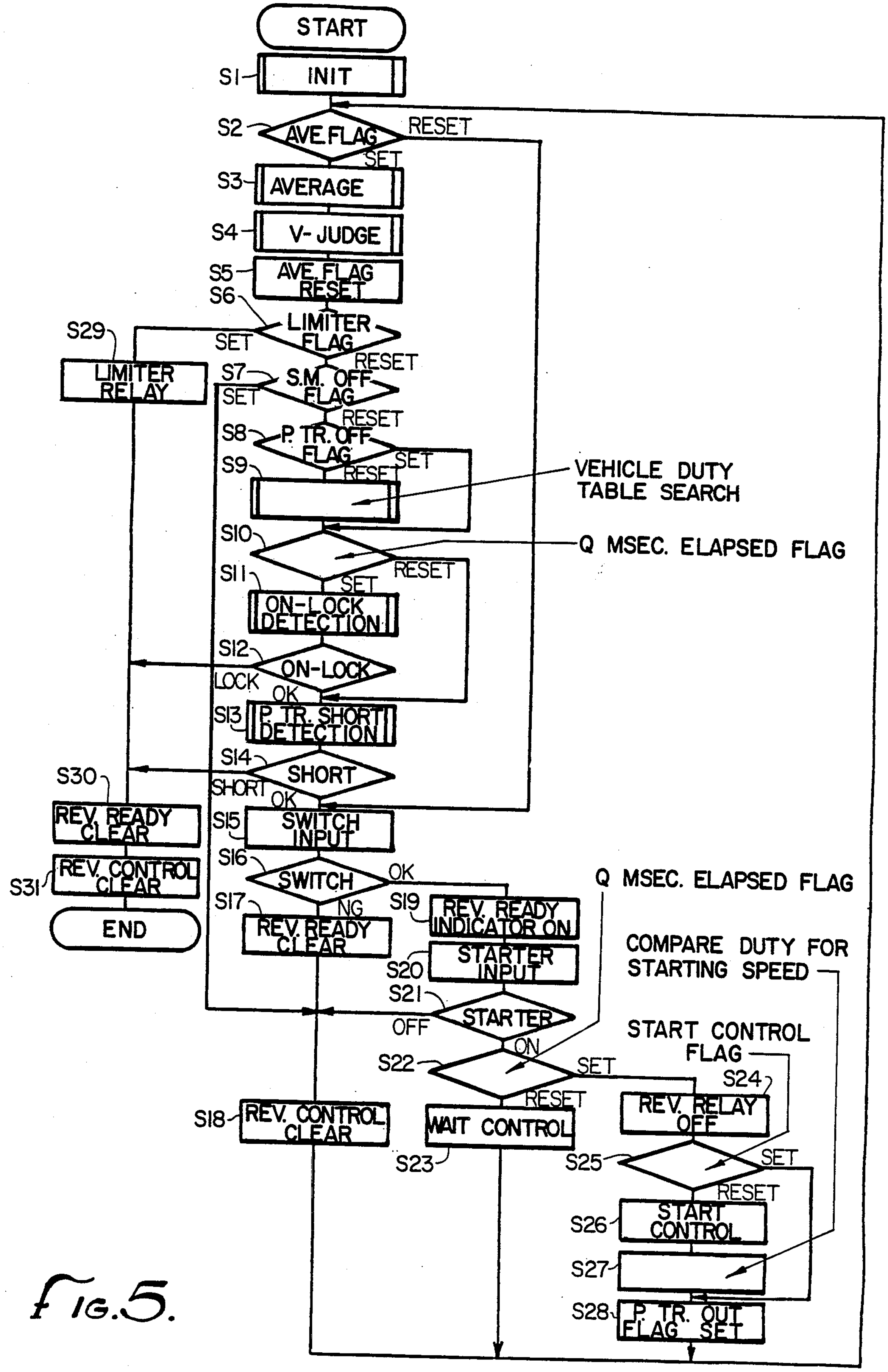
FIG. 5 is a flow chart of a main program routine for use with the present invention.

FIG. 5 is a flow chart of a main program routine for use with the present invention. At step 1, flags and conditions are initialized, as is well known in the art.

At step 2, the routine checks the average flag. If the average flag is set, control continues with step 3; otherwise control continues with step 15. At step 3, the average of the terminal voltages for the starter motor 8 is calculated. The average voltage $y_n$ is calculated by proportionately adding the digital value of the presently-sampled voltage $x_n$ to the calculated average voltage $y_{n-1}$, thus:

$$y_n=(a)\cdot(y_{n-1})+(1-a)\cdot(x_n),$$

where "a" is a constant of proportion.

At step 4, the speed of the vehicle is calculated, using the motor terminal voltage calculated in step 3 above ($V_m$). In step 4, three flags are also determined with reference to $V_m$. FIG. 6 shows the treatment of three flags. A power-transistor-off ("PTR-off") flag is reset when $V_m<bV$, and it is set otherwise. A starter-magnetic-switch-off ("SM-off") flag is set when it is already reset and $V_m>cV$, and the SM-off flag is reset when it is already set and $V_m<bV$. A limiter flag is reset when $V_m<dV$, and it is set otherwise. As the motor terminal voltage $V_m$ substantially corresponds to the speed of the vehicle, the flags noted above are set based on the speed of the vehicle.

At step 5, the average flag is reset.

At step 6, the routine checks the limiter flag. As noted herein, if $V_m$ is greater than or equal to dV, the limiter flag is reset, and the vehicle is assumed to be in reverse on a slope at an excessive speed (i.e. greater than a predetermined speed). If the limiter flag is not set, control continues with step 7; otherwise control continues with step 29.

At step 29, current is supplied from the terminal 137-10 of the ECU 137 to the speed limiter relay 132, thus activating the relay 132. This forms a circuit which includes the starter motor 8, the resistor 126, the fuse 144 and the relay 132, which serves to brake the starter motor 8. At step 30, the reverse indicator lamp 154 is turned off. At step 31, the reverse control is stopped, and the routine is terminated.

Figure 7:
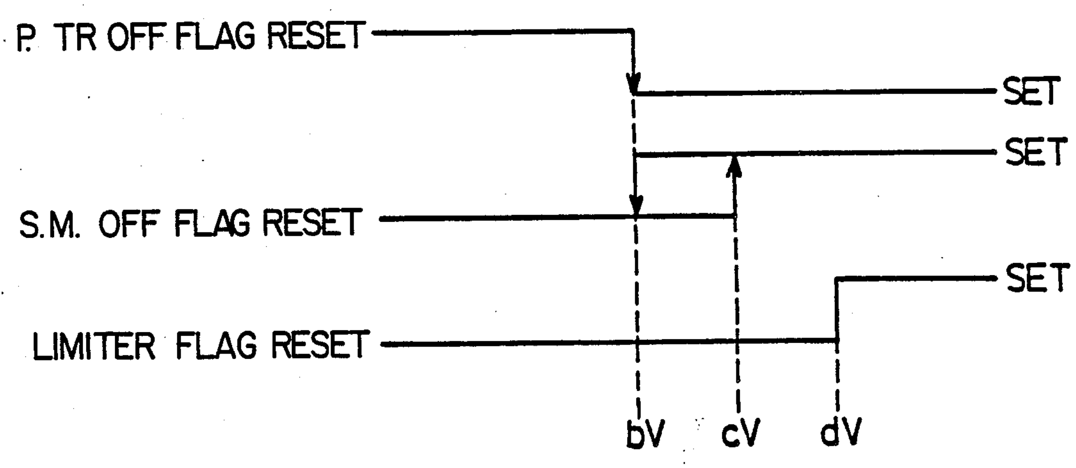
FIG. 7 is a drawing showing a method of setting flags for use in determining vehicle speed.

Upon reaching step 7, the routine has determined that vehicle speed is less than the predetermined limit speed $V_m<dV$). The reverse speed of the vehicle is controlled by control of the duty cycle of the power transistor 123. FIG. 7 relates motor terminal voltage and duty cycle of the reverse control. The duty cycle is controlled when $V_m<bV$. The duty cycle (STDT) is maximized when $V_m$ is less than or equal to aV; it is minimized (EDDT) when $V_m=bV$, at which point control is stopped.

At step 7, the routine checks the SM-off flag. It the SM-off flag is not set, control continues with step 8; otherwise control continues with step 18. Accordingly, at step 18, the reverse control is stopped, and control continues thereafter with step 2. As noted herein, once the SM-off flag is set, it is not reset until the motor terminal voltage $V_m<bV$; once the SM-off flag is reset, vehicle speed is controlled in the range of point A to point B, as shown in FIG. 7.

At step 8, the routine checks the PTR-off flag. If the PTR-off flag is not set, control continues with step 9; otherwise control continues with step 10. At step 9, the vehicle speed duty cycle table is retrieved from the ROM 160, so that the excitation time for the power transistor 123 can be calculated.

At step 10, the routine checks the q-msec-elapsed flag. As noted herein, vehicle speed control and detection of on-lock are delayed for a time period of q msec after the starter switch 127 is closed. If the q-msec-elapsed flag is set, control continues with step 11; otherwise control continues with step 13. At steps 11–12, the routine checks if on-lock has occurred (i.e. if motor terminal voltage $V_m<+3.0$ volts has continued for about 3 to about 5 seconds, per step 56 of the interrupt routine). If on-lock has not occurred, control continues with step 13; otherwise control continues with step 30.

At steps 13–14, the routine checks if PTR-short has occurred (i.e., if a motor terminal voltage $V_m>+1.5$ volts has continued for r msec or more, per step 58 of the interrupt routine). If PTR-short has not occurred, control continues with step 15; otherwise control continues with step 30.

At step 15, the condition of side the stand switch 135 and the oil pressure switch 136 are input to the CPU 159. At step 16, the routine checks these switch conditions. If the side stand switch 135 is off, or if the oil pressure switch 136 is on, control continues with step 17; otherwise control continues with step 19. At step 17, the reverse indicator lamp 154 is turned off and control continues thereafter with step 18, where reverse control is stopped. Thus, reverse control is inhibited unless the side stand is lifted and the engine is not operating. For the device of FIGS. 16–19, the reverse control is inhibited when the engine is not running.

At step 19, the reverse indicator lamp 154 is turned on. At step 20, the condition of the starter switch 127 is input to the CPU 159. At step 21, the routine checks this switch condition. If the starter switch is on, control continues with step 22; otherwise control continues with step 18 and stops the reverse control. At step 22, the routine checks the q-msec-elapsed flag. If the q-msec-elapsed flag is set (i.e. q msec have elapsed since the starter switch 127 was closed), control continues with step 23; otherwise control continues with step 24.

At step 23, the routine waits until q msec have elapsed and sets the q-msec-elapsed flag.

At step 24, the reverse relay 130 is turned off. Operation of the first magnetic relay 121 via the reverse relay 30 is effected only for the time period of q msec. After q msec have elapsed, current for self-holding relay 121 is supplied via the coil 121*b* by the starter magnetic controller 131; this avoids the excess consumption of electric power.

At step 25, the routine checks the start-control flag. The start-control flag is not set when the vehicle is just starting up and special startup vehicle speed control is required. The start-control flag is set when this startup period is over. If the start-control flag is not set, control continues with step 26; otherwise control continues with step 28.

Figure 8:
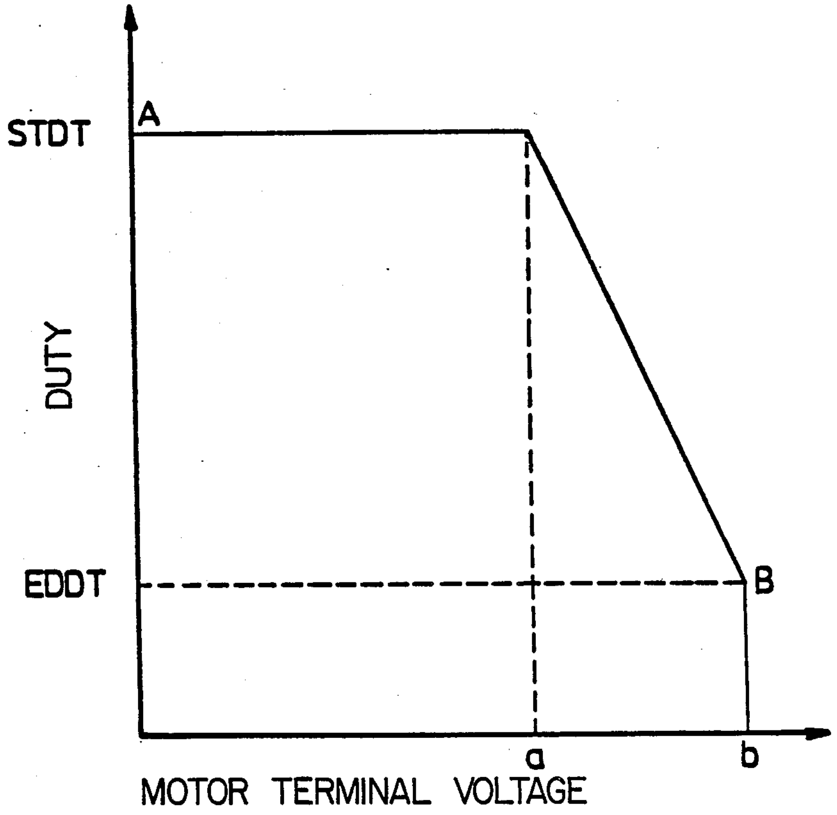
FIG. 8 is a graph relating motor terminal voltage and duty cycle of the reverse control.
Figure 9:
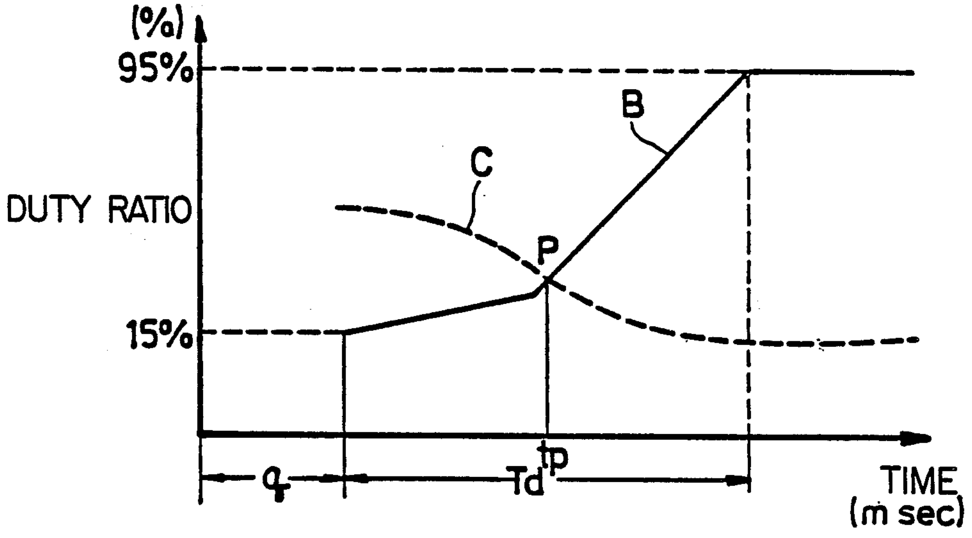
FIG. 9 is a graph relating duty cycle of the reverse control and time elapsed for the start control.

At steps 26–27, special startup vehicle speed control is executed. FIG. 8 is a graph relating duty cycle of the reverse control and time elapsed for the start control during the special startup period. The power transistor 123 is turned off and kept off for a time period of q msec after the starter switch 127 is closed. Voltage to be applied to the starter motor 8 is reduced, so as to start the starter motor 8 at low speeds. Thereafter, the duty cycle of the power transistor 123 is regulated for a time period of Td msec after q msec have elapsed.

Curve B shows a permissable maximum value of the duty cycle ratio as time proceeds after the starter switch 127 is closed. Accordingly, at step 26, the values which relate the duty cycle to time elapsed, according to curve B, are retrieved from the ROM 160. The start control time Td is monitored; when Td has elapsed, the start-control flag is set.

At step 27, the values which relate the duty cycle to time elapsed, according to curve C, are retrieved from the ROM 60. These values are compared with the values according to curve B, and the smaller of the duty cycle values from curves B and C is selected.

At step 28, the power-transistor-out ("PTR-out") flag is set, and control continues with step 2.

In summary, operation after closing of the starter switch 127 proceeds as follows: When the starter switch 127 is closed, the ECU 137 first performs initialization (step 1). Until the motor terminal voltage is digitized (step 2), the routine checks the side stand switch 135 and the oil pressure switch 136 to see if the vehicle can be reversed. If so, the reverse indicator lamp 154 is turned on (step 19). The routine next checks if the starter switch 127 is still closed (step 21), and awaits the end of the q msec time period (step 23).

After the motor terminal voltage is digitized (step 2), the average of voltages is calculated (step 3), the speed of the vehicle is determined (step 4), and several flags are set or reset (steps 4–5). If the speed of the vehicle does not exceed a predetermined limit $V_m = dV$ (step 6), and is lower than an upper limit $V_m = cV$ (step 7), the routine proceeds with several checks. The routine checks the PTR-off flag (steps 8–9), the q-msec-elapsed flag (step 10), the on-lock condition (steps 11–12), the PTR-short flag (steps 13–14), the condition of the side stand switch 135 and the oil pressure switch 136 (steps 15–16), the starter switch 127 again (steps 20–21), and the q-msec-elapsed flag again (step 22).

If the time period of q msec has elapsed, special start control is executed for a time period of about Td msec after the q msec have elapsed after closing the starter switch 127. After the initial period of special start control, the duty cycle of the power transistor 123 is determined in relation to vehicle speed (step 9). If the speed of the vehicle exceeds an upper limit, the reverse control is stopped (step 18). Moreover, if the speed of the vehicle exceeds the predetermined limit speed, the speed limiter relay 32 is turned on as a power brake (step 29) and the reverse control is stopped (step 31).

The circuit herein disclosed thus comprises a power circuit for supplying power to the starter motor including a first and second switch in series in the circuit. A suppressor circuit may be associated with the first switch, for closing the first switch either when the vehicle is started, or when the vehicle is operated in reverse. A second suppressor circuit may be associated with the second switch, which opens the second switch only when the vehicle is operated in reverse. Finally, a third switch, for regulating the speed of the vehicle in reverse, may be operatively connected in parallel with the second switch.

With this arrangement, when the engine is started, both the first and second switches are closed, and the circuit is completed for powering the starter motor for starting the engine. When the vehicle is operated in reverse, the first switch is closed but the second switch remains open. A circuit is completed which includes the first and third switches, for powering the starter motor for operating the vehicle in reverse at a regulated speed.

Figure 19:
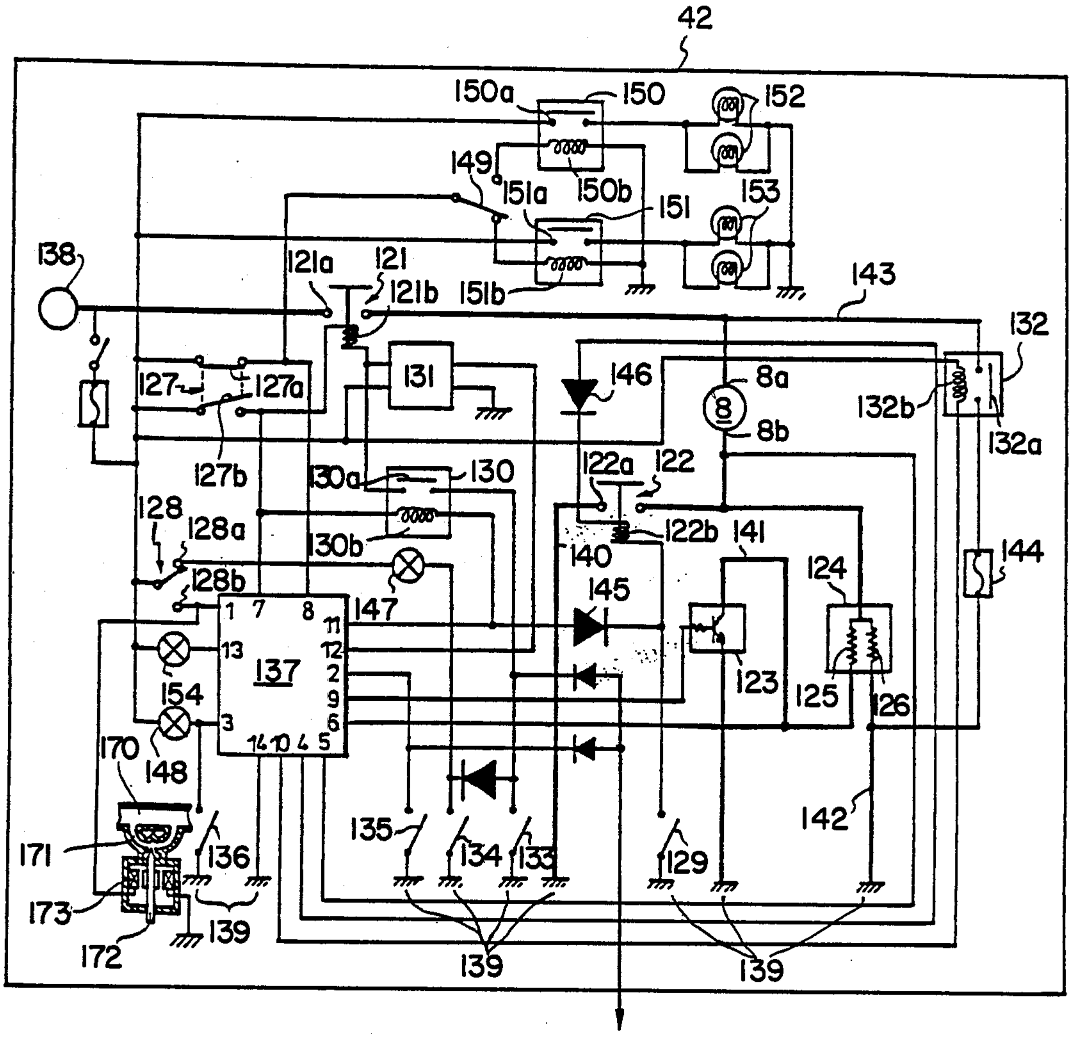
FIG. 19 is a circuit diagram of the electric control device of FIG. 3 with an engine speed control.

Turning to FIG. 19, in case the rotating speed of the starter motor 8 at reversing is high, the multiple cylinder engine 1 may be accelerated in the following manner. That is, the contact 128*b* of the reverse switch 128 upon switching same by lifting the reverse lever 18 is connected to a solenoid 173 for opening a valve 172 provided in a bypass passage 171 of a carburetor 170 of the multiple cylinder engine as shown in FIG. 19. Thus, the valve 172 in the bypass passage 171 is closed at reversing to increase a quantity of suction air to the carburetor 170, thereby accelerating the multiple cylinder engine 1.

Alternatively, the contact 128*b* of the reverse level switch 128 may be connected to an ignition device or the like, so as to increase the rotating speed of the multiple cylinder engine 1 at reversing.

While a preferred embodiment is disclosed herein, many variations are possible which remain within the scope of the invention, and these variations would become clear to one skilled in the art after a perusal of the specification, drawings and claims herein.

We claim:

1. In a vehicle reverse control device for reversing a vehicle by a driving force of a starter motor, the improvement comprising
   - a power circuit of said starter motor;
   - a first switch for controlling excitation of said starter motor;
   - a second switch adapted to be closed at starting;
   - said first switch and said second switch being placed in series in said power circuit; and
   - a reverse control circuit including
     - a current adjusting means adapted to be switched on upon reversing, and a resistor connected in series to said current adjusting means;

said reverse control circuit being connected in parallel to said second switch.

2. A device as in claim 1, wherein said second switch is a relay switch adapted to be closed only when the vehicle is in any condition other than a reverse condition, and said second switch includes a suppressing circuit capable of closing said first switch.

3. In a vehicle reversing device for reversing a saddle vehicle having an engine by utilizing a driving force of a starter motor, a reverse control device comprising a power circuit of said starter motor;

a first switch for controlling the operation of said starter motor;

a second switch adapted to be closed at starting;

said first switch and said second switch being placed in series in said power circuit;

a suppressing circuit for suppressing current to be supplied to said starter motor, said suppressing circuit being connected in parallel to said second switch;

a starter switch for closing said first switch, at least one of the group composed of said first switch and said starter switch being located in the vicinity of a handle grip; and a reverse detection circuit for detecting that an output from said starter motor has been switched to a vehicle reversing direction, said second switch being opened according to an output from said reverse detection circuit.

4. In a vehicle reversing device for a vehicle mounting an internal combustion engine therein, wherein a driving force of a starter motor upon rotation thereof is normally transmitted through a one-way clutch to a crank shaft, said vehicle reversing device being capable of starting said internal combustion engine by the driving force of said starter motor, and said vehicle reversing device being capable of reversing said vehicle by the driving force of said starter motor as required, a vehicle reverse control device comprising operational condition detecting means for detecting an operational condition of said internal combustion engine; and control means for enabling a reverse operation of said starter motor according to a detection signal from said operational condition detecting means.

5. In a vehicle reversing device for reversing a vehicle by a driving force of a starter motor, a vehicle reverse control device comprising a power circuit of said starter motor;

a first switch and a second switch placed in series in said power circuit;

a third switch connected in parallel to said second switch;

a first suppressing means associated with said first switch and adapted to close said first switch only when at least one of the group composed of a condition for starting an internal combustion engine and a condition for reversing said vehicle is established; and a second suppressing means associated with said second switch and adapted to open said second switch only when the condition for reversing said vehicle is established;

said third switch regulating a reversing speed.

* * * * *